(12) United States Patent
Nizami et al.

(10) Patent No.: US 8,326,813 B2
(45) Date of Patent: Dec. 4, 2012

(54) SYSTEM AND METHOD FOR DATA MANAGEMENT

(75) Inventors: Javeed Nizami, Plano, TX (US); Reiner K. Kaiser, Redondo Beach, CA (US)

(73) Assignee: Siemens Product Lifecycle Management Software, Inc., Plano, TX (US)

( * ) Notice: Subject to any disclaimer, the term of this patent is extended or adjusted under 35 U.S.C. 154(b) by 229 days.

(21) Appl. No.: 12/690,188

(22) Filed: Jan. 20, 2010

(65) Prior Publication Data

US 2011/0178998 A1     Jul. 21, 2011

(51) Int. Cl.
*G06F 17/30* (2006.01)
(52) U.S. Cl. ........................................ 707/702
(58) Field of Classification Search ............ 707/610, 707/620, 702
See application file for complete search history.

(56) References Cited

U.S. PATENT DOCUMENTS

| | | | | |
|---|---|---|---|---|
| 5,717,902 A | * | 2/1998 | D'Souza et al. | 717/162 |
| 5,724,575 A | * | 3/1998 | Hoover et al. | 1/1 |
| 5,873,075 A | | 2/1999 | Cochrane et al. | |
| 6,101,507 A | * | 8/2000 | Cane et al. | 707/999.201 |
| 6,397,125 B1 | | 5/2002 | Goldring et al. | |
| 7,493,344 B2 | * | 2/2009 | Wald et al. | 1/1 |
| 7,536,678 B2 | * | 5/2009 | Kothari et al. | 717/124 |
| 7,685,183 B2 | * | 3/2010 | Pace et al. | 707/610 |
| 7,774,300 B2 | * | 8/2010 | Hsiao et al. | 707/602 |
| 2002/0165724 A1 | * | 11/2002 | Blankesteijn | 705/1 |
| 2003/0120902 A1 | * | 6/2003 | Kottapalli et al. | 712/216 |
| 2003/0212681 A1 | * | 11/2003 | Kasper, II | 707/9 |
| 2006/0161894 A1 | * | 7/2006 | Oustiougov et al. | 717/121 |
| 2010/0274759 A1 | | 10/2010 | Takeuchi et al. | |

* cited by examiner

*Primary Examiner* — Jorge A Casanova

(57) ABSTRACT

A system, method, and computer program product for data transfer. The method includes receiving a request to transfer a principal object from a source location to a target location. The method also includes receiving at least one closure rule corresponding to the principal object, and transferring the principal object from the source location to be stored in the target location. The method also includes identifying at least one secondary object to be transferred with the principal object, according to the at least one closure rule. The method also includes selectively transferring the secondary object from the source location to be stored in the target location.

18 Claims, 4 Drawing Sheets

SYSTEM AND METHOD FOR DATA MANAGEMENT

CROSS-REFERENCE TO OTHER APPLICATION

The present application has some Figures or specification text in common with, but is not necessarily otherwise related to, U.S. patent application Ser. No. 12/690,180 for "System and Method for Data Retrieval", filed concurrently herewith, that is hereby incorporated by reference.

TECHNICAL FIELD

The present disclosure is directed, in general, to data management systems and methods, including the management of very complex product lifecycle (PL) data.

BACKGROUND OF THE DISCLOSURE

PL data can be very complex with many referencers, dependencies, and a large number of different classes that have to be traversed and processed in order to collect all data required for a successful consolidation effort or any other data transfer approach.

SUMMARY OF THE DISCLOSURE

Various disclosed embodiments include a system, method, and computer program product for data transfer. The method includes receiving a request to transfer a principal object from a source location to a target location. The method also includes receiving at least one closure rule corresponding to the principal object, and transferring the principal object from the source location to be stored in the target location. The method also includes identifying at least one secondary object to be transferred with the principal object, according to the at least one closure rule. The method also includes selectively transferring the secondary object from the source location to be stored in the target location.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Many data management systems, including product lifecycle (PL) management systems, have to support a ever increasing data model, supporting more and more applications, many of which manage data heavily customized by individual customer or users. Software algorithms to handle data traversal for the purpose of deep copy (clone), data transfer to other sites (multi-site), and managing of ownership need to have a data-model level understanding of which objects intrinsically belong together from a logical point of view. Many applications have hard coded logic handling these data dependency expressions in a case by case basis, and use excessive amounts of codeful logic which ultimately cannot be easily managed once the data model starts getting too big.

Disclosed embodiments include systems and methods that can express object model dependencies for structure traversal and ownership considerations in a codeless manner, which is more amenable to customizations as well.

Codeless handling of complex data dependencies for the purpose of data exchange, data collaboration and deep copy/clone provides significant advantages for a fully customizable generic system, including PL systems, and significantly reduces coding efforts, bug find rates and development maintenance costs.

Figure 1:
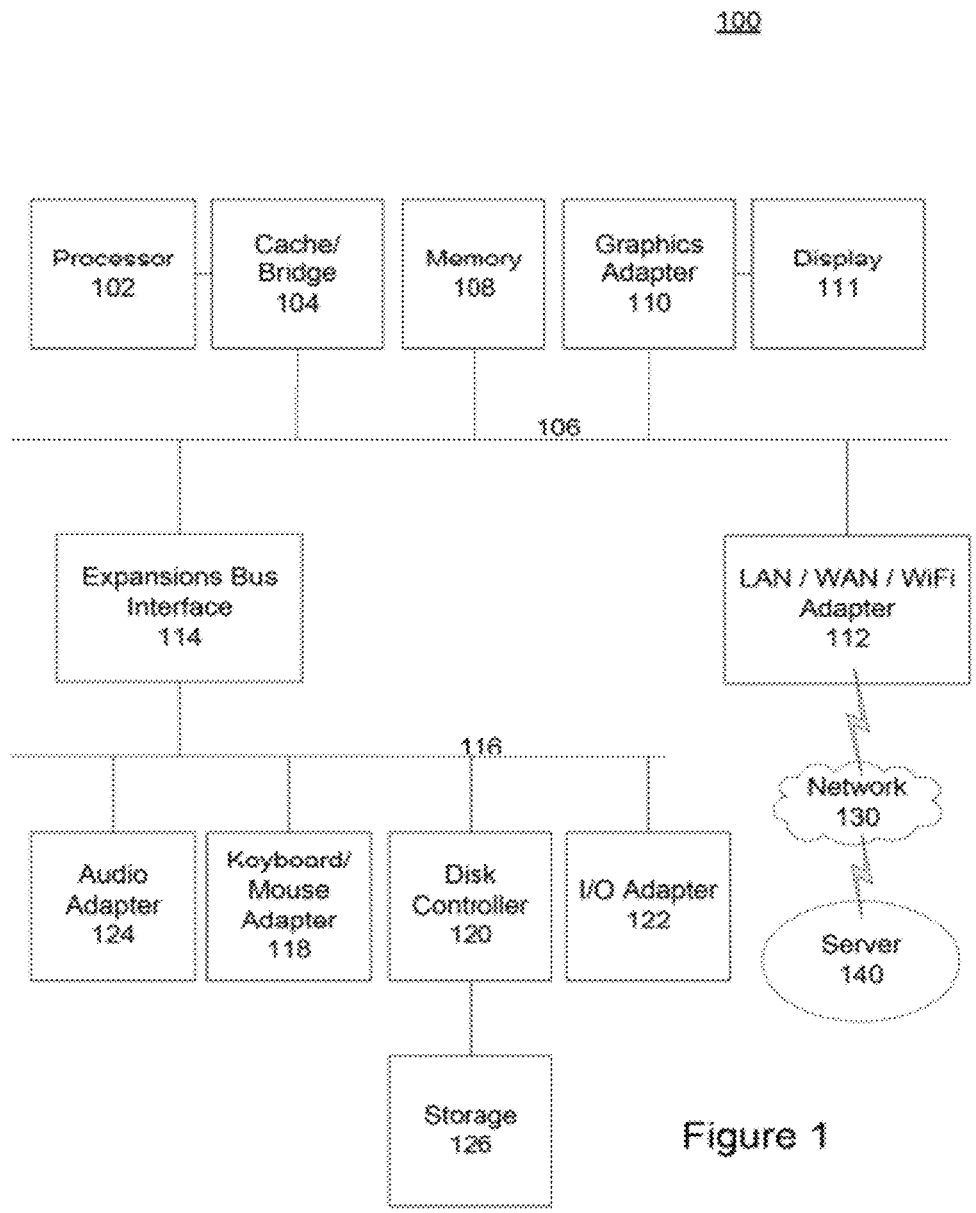
FIG. 1 depicts a block diagram of a data processing system in which an embodiment can be implemented.

FIG. 1 depicts a block diagram of a data processing system in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed systems and methods include the ability to formalize object model dependencies is such a way that data transfer, deep copy and clone logic can be implemented in a codeless manner.

An "island of data", as used herein, is defined as a set of objects which cannot be separated in a given context without risking data corruption and data loss. For example, an island of data is a set of dependent objects for a given principal object which have to be traversed, serialized, imported, or otherwise processed together with that primary object.

Figure 2A:
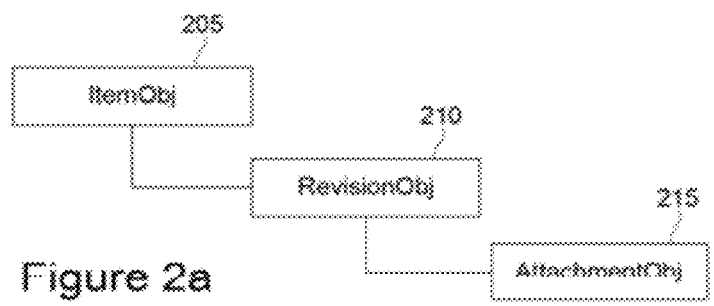
FIG. 2a depicts an exemplary object model including business object and its dependent objects.

FIG. 2a depicts an exemplary object model including business object and its dependent objects, where Attachment Obj 215 depends on RevisionObj 210, which in turn depends on ItemObj 205. If an application cannot handle instances of ItemObj 205 where either its corresponding RevisionObj 210 or its corresponding AttachmentObj 215 do not exist together, this means that the island of data must at least contain ItemObj 205, RevisionObj 210, and AttachmentObj 215. There could be more, but there cannot be less.

Figure 2B:
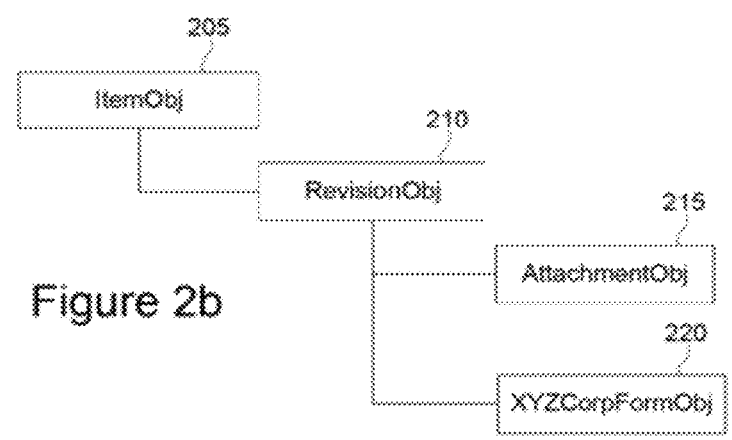
FIG. 2b corresponds to 2a, and depicts an object model including business object and its dependent objects.

FIG. 2b corresponds to 2a, and depicts an object model including business object and its dependent objects, where Attachment Obj 215 depends on RevisionObj 210, which in turn depends on ItemObj 205. This figure illustrates a case where a customer decides to customize their data model to add another XYZFormObject 220 to each RevisionObj 210. XYZCorp requires a custom form XYZFormObject 220 to exist with every business object such as RevisionObj 210.

In this example, the customer's customized data set requires that the system defines the corresponding island of data to also contain the XYZCorpFormObject 220 since in his business model an ItemObj 205 could not exist without an attachment XYZCorpFormObj 220.

Various embodiments apply one or more of the following rules for definition and manipulation of islands of data:

1) All objects in an island of data must be owned by the same site. As a corollary it follows that islands of data must always be transferred together, they cannot be split up as a consequence of a multi-site operation.

2) Deep copy behavior must be the same for all objects within an island of data. For example, given three possible actions, e.g., "Clone, Reference, Ignore", which could be applied to objects within an island of data, it is not permissible to apply different behaviors to different objects within the same island.

3) Codeless data transfer behavior of islands of data: if data transfer fails to replicate one object of an island of data, the system must regard the transfer with regard to the entire island of data as failed. Consequently, all other objects in the island that may have already successfully imported must be rolled back.

4) Consequences for data mapping between different systems: When objects are mapped between different systems or datasets, any resulting objects after mapping must also form islands of data, and any mapping of objects resulting in partial islands cannot be correct.

An island consists of a principal object which forms the nucleus of the island and its related objects which are members of the island. Implied in this definition is that the island will be incomplete if any of the related objects are missing from it. An example of an island as a Bill of Materials (BOM) data model in a PL system would be an item as the principal object with its Master forms, Item Revisions, BOMView, BVR and the PSOccurrences.

Further, the boundary of the island must be clear and unambiguous. It must be possible to clearly state if a particular object is inside of an island or not part of the island. As an example, consider the example described above of a typical BOM data model, it should be very clear from the definition of the island that the Child Item of the PSOccurrence is not part of the island. The island must be defined in such a way that it is self contained and has minimal external dependencies. For example, if a dataset is defined to be in an island, other objects such as the NamedReference(s) and RevisionAnchor must also be included in the same Island.

Various embodiments include for fundamental application logic and processes which allow implementation in a codeless manner. Further, new data models can be easily supported and data dependencies can be customized.

Various embodiments also process references between objects in different islands of data, and address behavior during data transfer, deep copy, and other interactions between different islands of data. Island content can vary for given business rules and option sets. That is, the island defined for a particular object may differ according to the particular use of the principal object by a specific system or application.

Different ownership of a reference and a referencer is permitted. Stubbed objects are permitted; that is, various embodiments permit a replica object having a reference pointing to an object that does not exist. Data transfer of the referenced object is not required if the referencer is data transferred. In a similar manner, deep copy rules for reference and referencer are not required to be the same.

Various embodiments use closure rules and inter-island predicate as a mechanism to formalize and capture islands of data. A closure rule, as used herein, is a rule which allows the system to identify the additional objects needed given a principal object. Closure rules are rules that define what secondary objects must be retrieved along with a principal object to avoid corruption because of interdependencies between the objects, and so can define an island of data. The closure rules, in various embodiments disclosed herein, also define traversal and processing for the objects, and are recursive. Closure rules can be defined for each object, and define in individual clauses which objects will be pulled into such an island.

A closure rule can be presented in the form
CLASS.Class_a:CLASS.Class_b:ATTRIBUTE.refxyz: PROCESS+TRAVERSE In this example, when traversing data for the purpose of replication, whenever an object instance of class_a has been found, this rule clause would require the object of class_b to be processed as well if a reference existed to the class_b object instance.

In various embodiments, islands of data and closure rules are very closely related. A closure rule must not navigate too much or too little when given an object in an island of data. Further, a closure rule walks along the references between objects, but closure rule clauses can either navigate to objects outside an island ("inter island") or within an island ("intra island clauses).

Figure 3:
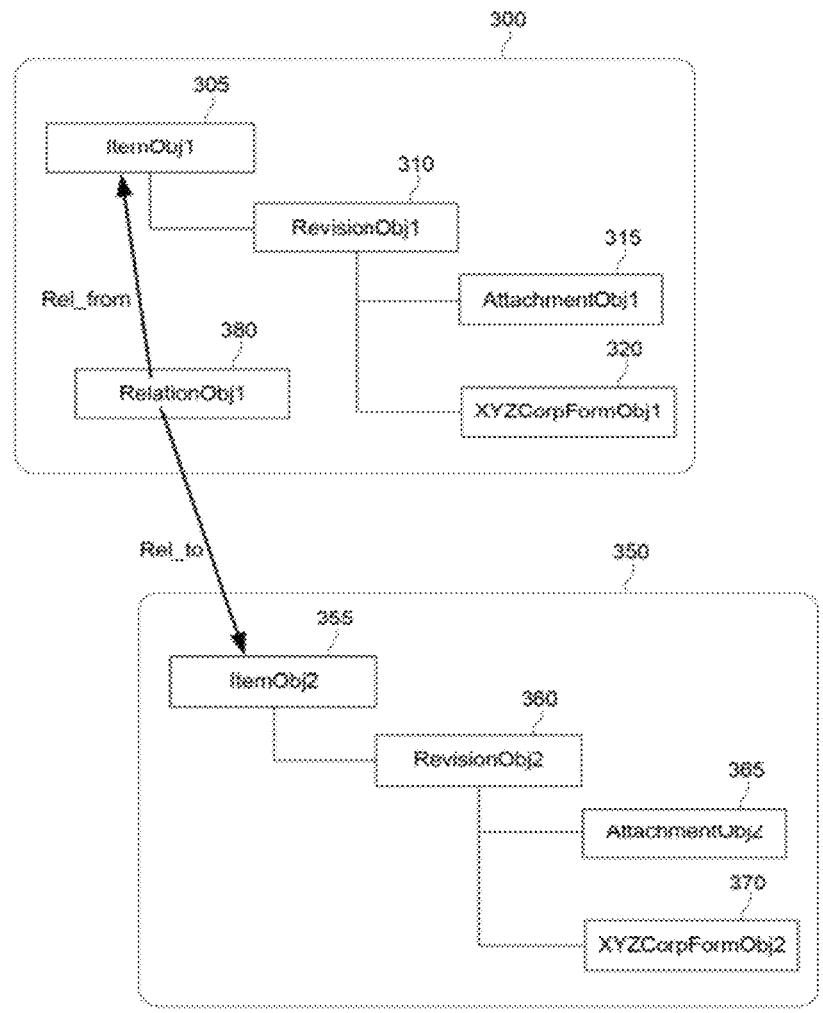
FIG. 3 depicts an exemplary first object model including a business object and its dependent objects.

FIG. 3 depicts an exemplary object instance diagram for two instances of ItemObj 305/355 with corresponding references, shown in Island1 300 and Island2 350. FIG. 3 illustrates closure rule clauses navigating outside islands.

FIG. 3 depicts an exemplary first object model Island1 300 including a business object and its dependent objects, where Attachment Obj1 315 depends on RevisionObj1 310, which in turn depends on ItemObj1 305. This figure illustrates a case where a customer decides to customize their data model to add another XYZCorpFormObject1 320 to each RevisionObj1 310. XYZCorp requires a custom form XYZCorpFormObject1 320 to exist with every business object such as RevisionObj1 310.

In this example, the customer's customized data set requires that the system defines the corresponding island of data to also contain the XYZCorpFormObject1 320 since in his business model an ItemObj1 305 could not exist without an attachment XYZCorpFormObj1 320.

FIG. 3 also depicts a second object model Island2 350 including business object and its dependent objects, where Attachment Obj2 365 depends on RevisionObj2 360, which in turn depends on ItemObj2 355. This figure illustrates a case where a customer decides to customize their data model to add another XYZCorpFormObject2 370 to each RevisionObj2 360. XYZCorp requires a custom form XYZCorpFormObject2 370 to exist with every business object such as RevisionObj2 360.

Island1 300 also includes a relationObject 380 that includes a "Rel_from" pointer to ItemObj1 305 in Island1 300 and a "Rel_to" pointer to ItemObj2 355 in Island2 350.

While most references are within the respective two islands, the relationObject 380 owned by Island1 300 has a reference pointing to a different island, Island2 350. The corresponding closure rule clauses can read as follows:
CLASS.ItemObj:CLASS.RevisionObj:ATTRIBUTE.*: PROCESS+TRAVERSE:intra_island
CLASS.RevisionObj:CLASS.AttachmentObj:ATTRIBUTE.*:PROCESS+TRAVERSE:intra_island
CLASS.RelationObj:CLASS.ItemObj:ATTRIBUTE.ref_to: PROCESS+TRAVERSE:inter_island The third closure rule clause traverses from Island1 300 to objects in a new island, Island2 350. Closure Rule clauses that specify cross island traversal are preferably marked as such. The ClosureRule class can have a schema attribute.

Disclosed embodiments provide a solution for codeless definition of data traversal behavior for complex and custom object models for the purpose of data transfer, ownership change, deep copy/clone etc. in a system such as a product lifecycle management (PLM) system or other complex system. Codeless formalism is particularly advantageous when requiring ability to process customized data model overlays and can also minimize cost of implementation for data model support.

As used herein, a third site is a site which is not the source or target site in a consolidation. It consists of two categories of sites. An external site is a site that has shared data that it owns or contains replicas from the source or target site. It is not in the multi-site federation of the source and target sites. An "other" site is an installation other than the source or target site which is in the same multi-site federation as the source and target sites.

As used herein, consolidation information can be comprised of the source site's definition data, and its product data. Site consolidation refers to the task of moving all the required information from the source site to the target site and performing cleanup and source site retirement. It can be broken into the three major phases of preparation, execution, and cleanup and retirement.

An island of data is the fundamental unit of transfer for site consolidation. It consists of a principal object and the additional objects on which it depends for its correct functional definition and usage within the system or relevant application.

Metadata refers to the information or a subset of the information maintained in the databases defining the system or maintained to describe the managed data.

Figure 4:
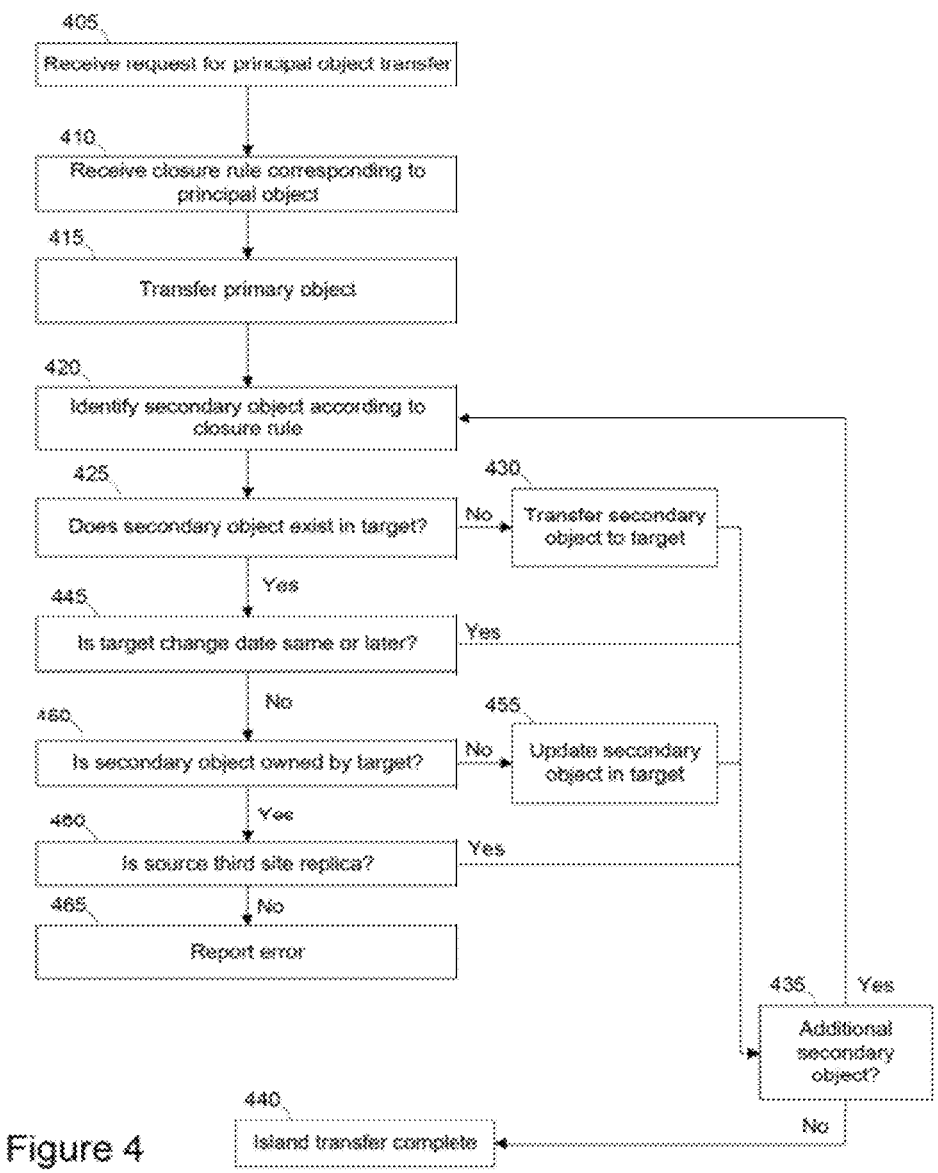
FIG. 4 depicts a flowchart of a process in accordance with disclosed embodiments.

Disclosed embodiments include a system and process for island-based import processing. Processing each island at a time and performing a single save operation per island will ensure that the creation of stubs is minimized. Also, in case there is a contention on locking an instance, the entire island will be re-tried and there will be no impact on other Islands being processed in the batch. As shown in FIG. 4, described below, for each UID (instance) in the TCXML a comparison is made to determine if the action required is to create the object as replica at the target site, to delete or remove the object, or to update the (replica of the) object.

If the import failed for any object in the island, the roll-back is performed for the operations executed for that specific island of objects. The processing of next island is continued.

This is done through setting the mark-point at the beginning of the processing of the island. While processing island object, for error in saving or updating any of the island object it is roll-back to this mark-point set at the starting of island processing.

FIG. 4 depicts a flowchart of a process in accordance with disclosed embodiments.

The system receives a request for the transfer of a principal object (step 405). As described herein, this may require that the entire corresponding island of data should be transferred to avoid corruption. As used herein, "receiving" can include loading from storage, receiving from another system or application, either locally or over a network, receiving from a user, or otherwise.

The system receives one or more closure rules corresponding to the principal object (step 410). The closure rules are as described herein, and define which other objects should be transferred or updated as part of the same island of data as the principal object.

The system transfers the principal object from the source location to the target location for storage in the target location (step 415). The source and target locations can be independent databases or applications, different data processing systems in communication with each other, or otherwise.

The system uses the closure rules as described herein to identify a secondary object corresponding to the principal object (step 420). In a data transfer scenario, the principal and secondary objects will exist in the source location, and each of them may or may not already exist in the target location.

The system determines if the secondary object exists in the target location (step 425). If the secondary object does not exist in the target location, the system transfers the secondary object from the source location to the target location for storage in the target location (step 430). If there are any additional secondary objects to be processed (step 435), the system returns to step 420; otherwise, the transfer is complete for the principal object and its island of data (step 440).

If the secondary object already exists in the target location (at step 425), the system determines if the modification or change date of the secondary object in the target location is the same as (or later than) that of the secondary object in the source location (step 445). If it is, then the target location already has a most-recent version of the secondary object, and the transfer of the secondary object is skipped. If there are any additional secondary objects to be processed (step 435), the system returns to step 420; otherwise, the transfer is complete for the principal object and its island of data (step 440).

If the modification or change date of the secondary object in the target location is earlier than that of the secondary object in the source location (at step 445), then the system determines whether the secondary object is owned by the target location (step 450). If the secondary object is not owned by the target location (at step 450), the system is free to update the secondary object at the target location, and the secondary object in the target location is updated according to the secondary object in the source location (step 455). If there are any additional secondary objects to be processed (step 435), the system returns to step 420; otherwise, the transfer is complete for the principal object and its island of data (step 440).

If the secondary object is not owned by the target location (at step 450), the system determines if the source is a third-site replica (step 460). If it is, the transfer of the secondary object is skipped. If there are any additional secondary objects to be processed (step 435), the system returns to step 420; otherwise, the transfer is complete for the principal object and its island of data (step 440). If the source is not a third-site replica, then an error has occurred. The error is reported by the system (step 465) and the transfer is typically cancelled, and all transfers and updates to this island of data are rolled back.

Various embodiments can be implemented using well known industry standards including the SQL structured query language and XML 1.0 extensible markup language. In other embodiments, different or customized query-style languages can be used, either natively or interpreted and converted into the SQL language.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for data transfer, comprising:
receiving a request, in a data processing system, to transfer a principal object from a source location to a target location;
receiving at least one closure rule, in the data processing system, corresponding to the principal object;
transferring the principal object from the source location, by the data processing system, to be stored in the target location;
identifying, by the data processing system, at least one secondary object from the source location, other than the principal object, needed to be transferred with the principal object to avoid data corruption, according to the at least one closure rule, wherein the at least one closure rule defines a recursive clause for traversing a set of objects associated with the primary object at the source location to identify the at least one secondary object based on references between objects in the set of objects; and selectively transferring the secondary object from the source location, by the data processing system, to be stored in the target location.

2. The method of claim 1, further comprising determining if the secondary object is already stored in the target location.

3. The method of claim 1, further comprising determining if a secondary object is already stored in the target location and is more recent than a secondary object stored in the primary location.

4. The method of claim 1, wherein the identifying and selectively transferring steps are repeated for a plurality of secondary objects.

5. The method of claim 1, wherein the at least one closure rule express object model dependencies for structure traversal and ownership considerations for the primary object in a codeless manner.

6. The method of claim 1, wherein the at least one closure rule defines what one or more secondary objects must be processed with the principal object to avoid the data corruption because of interdependencies between the principal object and the one or more secondary objects.

7. A data processing system comprising a processor and accessible memory, the data processing system particularly configured to perform the steps of:

receiving a request to transfer a principal object from a source location to a target location;

receiving at least one closure rule corresponding to the principal object;

transferring the principal object from the source location to be stored in the target location;

identifying at least one secondary object from the source location, other than the principal object, needed to be transferred with the principal object to avoid data corruption, according to the at least one closure rule, wherein the at least one closure rule defines a recursive clause for traversing a set of objects associated with the primary object at the source location to identify the at least one secondary object based on references between objects in the set of objects; and selectively transferring the secondary object from the source location to be stored in the target location.

8. The data processing system of claim 7, further configured to perform the step of determining if the secondary object is already stored in the target location.

9. The data processing system of claim 7, further configured to perform the step of determining if a secondary object is already stored in the target location and is more recent than a secondary object stored in the primary location.

10. The data processing system of claim 7, wherein the identifying and selectively transferring steps are repeated for a plurality of secondary objects.

11. The data processing system of claim 7, wherein the at least one closure rule express object model dependencies for structure traversal and ownership considerations for the primary object in a codeless manner.

12. The data processing system of claim 7, wherein the at least one closure rule defines what one or more secondary objects must be processed with the principal object to avoid the data corruption because of interdependencies between the principal object and the one or more one secondary objects.

13. A non-transitory computer-readable storage medium encoded with computer-executable instructions that, when executed, cause a data processing system to perform the steps of:

receiving a request to transfer a principal object from a source location to a target location;

receiving at least one closure rule corresponding to the principal object;

transferring the principal object from the source location to be stored in the target location;

identifying at least one secondary object from the source location, other than the principal object, needed to be transferred with the principal object to avoid data corruption, according to the at least one closure rule, wherein the at least one closure rule defines a recursive clause for traversing a set of objects associated with the primary object at the source location to identify the at least one secondary object based on references between objects in the set of objects; and selectively transferring the secondary object from the source location to be stored in the target location.

14. The computer-readable storage medium of claim 13, further including instructions to perform the step of determining if the secondary object is already stored in the target location.

15. The computer-readable storage medium of claim 13, further including instructions to perform the step of determining if a secondary object is already stored in the target location and is more recent than a secondary object stored in the primary location.

16. The computer-readable storage medium of claim 13, wherein the identifying and selectively transferring steps are repeated for a plurality of secondary objects.

17. The computer-readable storage medium of claim 13, wherein the at least one closure rule express object model dependencies for structure traversal and ownership considerations for the primary object in a codeless manner.

18. The computer-readable storage medium of claim 13, wherein the at least one closure rule defines what one or more secondary objects must be processed with the principal object to avoid the data corruption because of interdependencies between the principal object and the one or more secondary objects.

* * * * *